US012574584B2

(12) United States Patent
    Hur et al.

(10) Patent No.: US 12,574,584 B2
(45) Date of Patent: Mar. 10, 2026

(54) DISPLAY DEVICE, AND METHOD FOR CONTROLLING DEVICE ON BASIS OF IR SIGNAL RECEIVED USING IR LED

(71) Applicant: SAMSUNG ELECTRONICS CO., LTD., Suwon-si (KR)

(72) Inventors: Jaemyung Hur, Suwon-si (KR); Minsup Kim, Suwon-si (KR); Hojune Yoo, Suwon-si (KR); Kyoungshin Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/662,666

(22) Filed: May 13, 2024

(65) Prior Publication Data

US 2024/0298057 A1 Sep. 5, 2024

Related U.S. Application Data

(63) Continuation of application No. PCT/KR2022/018766, filed on Nov. 24, 2022.

(30) Foreign Application Priority Data

Jan. 20, 2022 (KR) ........................ 10-2022-0008667

(51) Int. Cl.
    *H04N 21/422* (2011.01)
    *H04N 21/443* (2011.01)
(52) U.S. Cl.
    CPC ... *H04N 21/42221* (2013.01); *H04N 21/4432* (2013.01)

(58) Field of Classification Search
    CPC .......... H04N 21/422; H04N 21/42204; H04N 21/42221; H04N 21/4432
    See application file for complete search history.

(56) References Cited

U.S. PATENT DOCUMENTS 5,572,260 A * 11/1996 Onishi ................... G11B 31/00
                                                    348/460
5,602,598 A * 2/1997 Shintani ............. H04N 21/4316
                                                    348/706

(Continued)

FOREIGN PATENT DOCUMENTS

JP        6-19265 Y2    5/1994
JP     2000-138640 A    5/2000

(Continued)

OTHER PUBLICATIONS

International Search Report (PCT/ISA/210) issued by the International Searching Authority on Mar. 2, 2023 in corresponding International Application No. PCT/KR2022/018766.

(Continued)

*Primary Examiner* — Michael B. Pierorazio
(74) *Attorney, Agent, or Firm* — Sughrue Mion, PLLC

(57) ABSTRACT

A display device including: an IR receiver configured to receive a first IR signal from a first remote control; an IR LED configured to transmit a second IR signal based on the first IR signal to an external device or receive a third IR signal from a second remote control; a first switching circuit and a second switching circuit connected to respective ends of the IR LED; a gain circuit and a filter circuit connected in sequence to the first switching circuit; and at least one processor configured to set a switching path to transmit the second IR signal or detect the third IR signal.

15 Claims, 5 Drawing Sheets

(56)                References Cited

U.S. PATENT DOCUMENTS

| | | | | |
|---|---|---|---|---|
| 6,338,059 | B1* | 1/2002 | Fields | G06F 16/9538 |
| | | | | 707/706 |
| 7,071,041 | B2* | 7/2006 | Yamazaki | H10D 86/0221 |
| | | | | 257/E27.111 |
| 8,131,545 | B1* | 3/2012 | Moreno | G10L 15/04 |
| | | | | 704/235 |
| 8,411,076 | B2* | 4/2013 | Berkay | H02M 3/145 |
| | | | | 348/730 |
| 8,707,381 | B2* | 4/2014 | Polumbus | G10L 15/22 |
| | | | | 704/251 |
| 11,228,797 | B2* | 1/2022 | Kim | H04N 21/42212 |
| 2002/0016786 | A1* | 2/2002 | Pitkow | G06F 16/9562 |
| 2002/0055950 | A1* | 5/2002 | Witteman | G06F 16/40 |
| | | | | 707/E17.009 |
| 2002/0067428 | A1* | 6/2002 | Thomsen | H04N 7/17318 |
| | | | | 348/E7.071 |
| 2003/0025832 | A1* | 2/2003 | Swart | H04N 21/4828 |
| | | | | 348/E7.071 |
| 2003/0051252 | A1* | 3/2003 | Miyaoku | H04N 21/42202 |
| | | | | 348/E7.071 |
| 2003/0117427 | A1* | 6/2003 | Haughawout | H04N 21/4222 |
| | | | | 715/710 |
| 2004/0181755 | A1* | 9/2004 | Murata | G06F 40/194 |
| | | | | 715/273 |
| 2005/0091274 | A1* | 4/2005 | Stanford | G06F 16/9577 |
| 2005/0188411 | A1* | 8/2005 | Dacosta | G06F 16/4387 |
| | | | | 348/E7.071 |
| 2005/0222989 | A1* | 10/2005 | Haveliwala | G06Q 30/02 |
| 2006/0004717 | A1* | 1/2006 | Ramarathnam | G06F 16/951 |
| 2006/0015339 | A1* | 1/2006 | Charlesworth | G10L 15/187 |
| | | | | 704/E15.02 |
| 2007/0067268 | A1* | 3/2007 | Dai | G06F 16/26 |
| 2007/0124756 | A1* | 5/2007 | Covell | G06F 16/635 |
| | | | | 348/E7.071 |
| 2007/0192310 | A1* | 8/2007 | Takagi | G06F 16/7844 |
| | | | | 707/999.005 |
| 2007/0300249 | A1* | 12/2007 | Smith | H04N 21/4788 |
| | | | | 725/19 |
| 2008/0052062 | A1* | 2/2008 | Stanford | G10L 15/26 |
| | | | | 704/E15.045 |
| 2008/0059526 | A1* | 3/2008 | Murakoshi | H04N 21/44008 |
| 2008/0183698 | A1* | 7/2008 | Messer | H04N 21/6175 |
| | | | | 707/999.005 |
| 2008/0204595 | A1* | 8/2008 | Rathod | H04N 21/44008 |
| | | | | 348/E7.001 |
| 2008/0281579 | A1* | 11/2008 | Tsukiji | G09B 19/06 |
| | | | | 704/3 |
| 2009/0198701 | A1* | 8/2009 | Haileselassie | G06F 16/9535 |
| 2011/0040559 | A1* | 2/2011 | Kim | G10L 21/055 |
| | | | | 704/271 |
| 2011/0069230 | A1* | 3/2011 | Polumbus | H04N 21/4884 |
| | | | | 707/711 |
| 2012/0062805 | A1* | 3/2012 | Candelore | H04N 21/482 |
| | | | | 348/734 |
| 2014/0109137 | A1* | 4/2014 | Mushtaq | H04N 21/4828 |
| | | | | 725/37 |
| 2015/0135206 | A1* | 5/2015 | Reisman | H04H 20/93 |
| | | | | 725/18 |
| 2015/0135214 | A1* | 5/2015 | Reisman | H04H 60/35 |
| | | | | 725/37 |
| 2016/0280420 | A1* | 9/2016 | Velasquez Posada | |
| | | | | B65D 25/00 |
| 2018/0167680 | A1* | 6/2018 | Finc | H04N 21/44218 |
| 2020/0389693 | A1* | 12/2020 | Bartlett | H04N 21/42221 |

FOREIGN PATENT DOCUMENTS

| | | | |
|---|---|---|---|
| JP | 2004-147237 | A | 5/2004 |
| JP | 2009-100310 | A | 5/2009 |
| KR | 10-2002-0033969 | A | 5/2002 |
| KR | 10-2013-0021247 | A | 3/2013 |
| KR | 10-1274523 | B1 | 6/2013 |
| KR | 10-1364679 | A1 | 2/2014 |
| KR | 10-1509493 | B1 | 4/2015 |
| KR | 10-2016-0042229 | A | 4/2016 |
| KR | 10-2020-0037567 | A | 4/2020 |

OTHER PUBLICATIONS

Written Opinion (PCT/ISA/237) issued by the International Searching Authority on Mar. 2, 2023 in corresponding International Application No. PCT/KR2022/018766.

* cited by examiner

DISPLAY DEVICE, AND METHOD FOR CONTROLLING DEVICE ON BASIS OF IR SIGNAL RECEIVED USING IR LED

CROSS REFERENCE TO RELATED APPLICATION(S)

This application is a continuation of International Application No. PCT/KR2022/018766, filed on Nov. 24, 2022, in the Korean Intellectual Property Receiving Office, which is based on and claims priority to Korean Patent Application No. 10-2022-0008667, filed on Jan. 20, 2022, in the Korean Intellectual Property Office, the disclosures of which are incorporated by reference herein in their entireties.

BACKGROUND

1. Field

This disclosure relates to a display device that may detect an IR signal in a predetermined frequency band from a remote control of an external device by adding a first switching circuit and a second switching circuit to both ends of an IR LED configured to provide a universal remote control (e.g., multi-brand remote (MBR) control) function and connecting a gain circuit and a filter circuit to the first switching circuit, and control a power state of the display device based on the detected signal, and a control method thereof.

2. Description of Related Art

A display device may display an image based on an image signal received from an external source or generated by the device itself, and may include various components classified by function on the basis of a display panel on which the image is displayed. Further, the display device may be used together with various types of peripheral external devices (e.g., a set-top box, etc.) according to functions to be implemented. In such a circumstance, a user may control the external device via the display device using a universal remote control of the display device, or directly control the external device using a remote control of the external device.

When the external device is directly controlled via its remote control, the display device may need to determine whether the remote control of the external device directly controls the external device for power control, such as e.g., maintaining a power-on state or switching to a power-on state. This may require the display device to include an IR receiver capable of receiving a carrier frequency band transmitted by the remote control of the external device. For example, in order to receive and demodulate an IR signal in a 56 kHz frequency band of a remote control of an external device internationally commonly used, the display device may need to separately include an IR receiver capable of receiving and demodulating such a 56 kHz frequency band.

SUMMARY

In order to provide an IR blaster or MBR function, that is, a function of transmitting an IR signal received from a universal remote control to a connected external device, a display device may have an IR LED. In case that circuitry of the display device is configured to detect an IR signal in a predetermined frequency band by utilizing not only the transmission characteristics but also the reception characteristics of the IR LED, it may not be necessary for the display device to separately have an IR receiver for receiving the IR signal in the predetermined frequency band, and therefore, the circuit configuration of the display device may be further simplified and its manufacturing costs may be reduced.

Provided is a display device that may detect an IR signal in a predetermined frequency band from a remote control of an external device by adding a first switching circuit and a second switching circuit to both ends of an IR LED configured to provide a universal remote control function and connecting a gain circuit and a filter circuit to the first switching circuit, and control a power state of the display device based on the detected signal, and a control method thereof.

Additional aspects will be set forth in part in the description which follows and, in part, will be apparent from the description, or may be learned by practice of the presented embodiments.

According to an aspect of the disclosure, a display device may include: an IR receiver configured to receive a first IR signal from a first remote control; an IR LED configured to transmit a second IR signal based on the first IR signal to an external device or receive a third IR signal from a second remote control; a first switching circuit and a second switching circuit connected to respective ends of the IR LED; a gain circuit and a filter circuit connected in sequence to the first switching circuit; and at least one processor configured to set a switching path to transmit the second IR signal or detect the third IR signal.

The switching path may include a first switching path and a second switching path respectively corresponding to operations of an IR detecting mode configured to detect the third IR signal and an IR blasting mode configured to transmit the second IR signal, where the at least one processor is further configured to set the switching path as the first switching path to operate in the IR detecting mode or as the second switching path to operate in the IR blasting mode.

The at least one processor may be further configured to: set the switching path as the first switching path, in case that the second IR signal is to be transmitted to the external device through the IR LED, set the switching path as the second switching path, and in case that the second IR signal is to be transmitted to the external device through the IR LED, switch the switching path to the second switching path, and after transmitting the second IR signal to the external device through the IR LED, return the switching path to the first switching path.

The third IR signal may be a preset IR signal at a predetermined IR carrier frequency or a frequency included in a predetermined IR carrier frequency band.

The gain circuit may be configured to generate a fourth IR signal by amplifying a strength of an IR signal received by the IR LED by a predetermined gain, and the filter circuit may be configured to filter the third IR signal from the fourth IR signal.

A power state of the display device may include a power-on state and a power-off state, and the at least one processor may be further configured to: in case that the third IR signal is detected in the power-off state, control to switch the power state to the power-on state, and in case that the third IR signal is detected in the power-on state, control to maintain the power state in the power-on state.

In case that the second IR signal is not transmitted or the third IR signal is not detected for a predetermined time in the power-on state, the at least one processor may be further configured to control to switch the power state to the power-off state.

The first IR signal may be an IR carrier frequency in a 38 kHz frequency band, and the third IR signal may be an IR carrier frequency in a 56 kHz frequency band.

According to an aspect of the disclosure, method for controlling a display device may include: receiving a first IR signal from a first remote control; generating a second IR signal based on the first IR signal; setting a switching path to transmit the second IR signal to an external device or to detect a third IR signal from a second remote control; transmitting the second IR signal to the external device based on the switching path; and detecting the third IR signal from the second remote control based on the switching path.

The switching path may include a first switching path and a second switching path respectively corresponding to operations of an IR detecting mode configured to detect the third IR signal and an IR blasting mode configured to transmit the second IR signal, where the setting the switching path includes setting the switching path as the first switching path to operate in the IR detecting mode or as the second switching path to operate in the IR blasting mode.

The setting the switching path may further include: setting the switching path as the first switching path, in case that the second IR signal is to be transmitted to the external device, switching the switching path to the second switching path, and after transmitting the second IR signal to the external device, returning the switching path to the first switching path.

The third IR signal may be a preset IR signal at a predetermined IR carrier frequency or a frequency included in a predetermined IR carrier frequency band.

The detecting the third IR signal from the second remote control may include: generating a fourth IR signal by amplifying a strength of an IR signal received by an IR LED by a predetermined gain; and filtering the third IR signal from the fourth IR signal.

A power state of the display device may include a power-on state and a power-off state, where the method further includes: in case that the third IR signal is detected in the power-off state, controlling to switch the power state to the power-on state, and in case that the third IR signal is detected in the power-on state, controlling to maintain the power state in the power-on state.

The method may further include: controlling to switch the power state to the power-off state, in case that the second IR signal is not transmitted or the third IR signal is not detected for a predetermined time when the power state is in the power-on state.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described in detail with reference to the accompanying drawings. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

Figure 1:
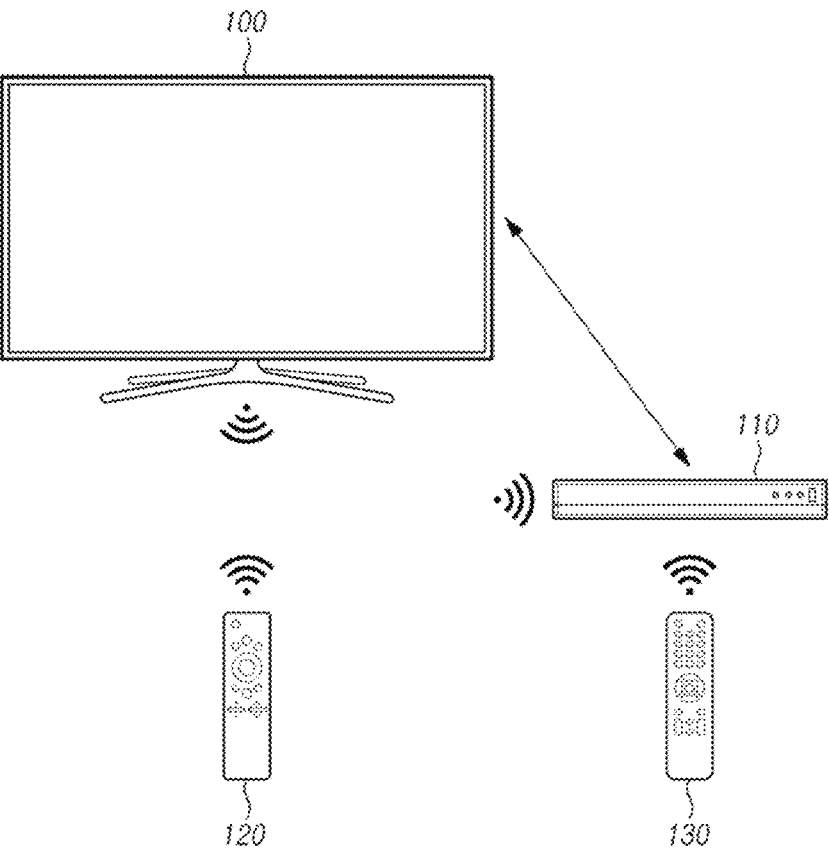
FIG. 1 is a block diagram of a configuration including a display device, an external device, a remote control of the display device, and a remote control of the external device, according to an embodiment of the disclosure.

FIG. 1 is a block diagram of a configuration including a display device, an external device, a remote control of the display device, and a remote control of the external device according to an embodiment of the disclosure.

According to various embodiments, the display device 100, which is an electronic apparatus capable of displaying an image, may be a home appliance such as a television (TV), an electronic frame, a digital billboard, a large format display (LFD), a digital signage, a desktop computer, a smartphone, a notebook PC, a tablet PC, a personal digital assistant (PDA), a laptop computer, a media player, an e-book terminal, a digital broadcasting terminal, a navigation device, a kiosk, a digital camera, a smart refrigerator, and the like, or other mobile or non-mobile computing devices, but the disclosure is not limited thereto. Further, the display device 100 may be a wearable device such as e.g., a head-mounted display, a smart watch, and smart glasses. It will be apparent to those skilled in the art that the display device 100 may be various types of devices capable of displaying images, without being limited to the aforementioned.

According to various embodiments, an external device 110 may output an image signal allowing the display device 100 to display various images. The external device 110 may include any one of a set-top box 110, a one connect (OC) box, a media box, an over-the-top (OTT) box, an optical disc player such as e.g., Blu-ray or a digital versatile disc (DVD), a desktop computer, a smartphone, a tablet, and the like. The external device 110 may receive an image from at least one image source, that is, an image signal source. Further, the external device 110 may receive an image provided in the form of a file according to a real-time streaming service via a wired or wireless network. The display device 100 and the external device 110 are connected/coupled to each other through a connection unit (connector) such as a wired or wireless interface, for example, an HDMI interface. It will be apparent to those skilled in the art that the connection unit is not limited to the HDMI interface, and a wired or wireless interface according to various standards may be applied. The display device 100 may receive AV data such as an image and a voice signal, and a control signal from the external device 110 through the connection unit.

According to various embodiments, a user of the external device 110 may remotely control the external device 110 using a remote control 130 of the external device 110. The remote control 130 of the external device 110 may include at least one button capable of controlling the external device 110, such as a power button, a channel button or the like. The remote control 130 of the external device 110 may transmit a control command corresponding to each button to the external device 110, using an infrared (hereinafter, also referred to as 'IR') signal in a predetermined frequency band. For example, the remote control 130 of the external device 110 may generate an infrared signal modulated using any one carrier frequency among 38 kHz, 40 kHz, and 56 kHz.

According to various embodiments, the user of the display device 100 may remotely control the display device 100 using a remote control 120 of the display device 100. The remote control 120 of the display device 100 may include at least one button capable of controlling the display device 100, such as e.g., a power button, a volume button or the like. The remote control 120 of the display device 100 may transmit a control command corresponding to each button to the display device 100, using an infrared signal. When the display device 100 provides a multi brand remote control (MBR) functionality, the user may also control devices other than the display device 100 by using a single remote control, that is, a universal remote control. For example, when the user of the display device 100 presses a button to control the external device 110 (e.g., a set-top box) using the remote control 120, the display device 100 may receive a control signal from the remote control 120, and then identify that the signal is a signal for controlling the external device 110, thereby transmitting an infrared signal for controlling the external device 110 to the external device 110. To this end, the display device 100 may include an IR receiver and an IR LED (also referred to as an infrared light emitting device). The IR receiver may receive an infrared control signal in a predetermined first frequency band from the remote control 120. The IR LED may generate an infrared signal in a predetermined second frequency band and transmit the infrared signal to the external device 110. For example, the display device 100 may receive an infrared control signal in a 38 kHz frequency band from the remote control 120 using the IR receiver, and may generate and transmit an infrared signal in a 56 kHz frequency band to the external device 110 using the IR LED.

According to an embodiment, when the user of the external device 110 controls the external device 110 remotely using the remote control 130 of the external device 110, the display device 100 may also need to detect the same and perform power control, such as e.g., maintaining a power-on state of the display device 100 or switching to a power-on state. To this end, circuitry of the display device 100 may be configured to detect the IR signal in a predetermined frequency band from the remote control 130 of the external device 110, by utilizing the reception characteristics of the IR LED provided to service the MBR function, without the need for the display device 100 to be additionally equipped with an IR receiver to detect the IR signal in the predetermined frequency band from the remote control 130 of the external device 110. A schematic circuit configuration and a switching path of the display device 100 according to this embodiment will be described below with reference to FIG. 2.

Figure 2:
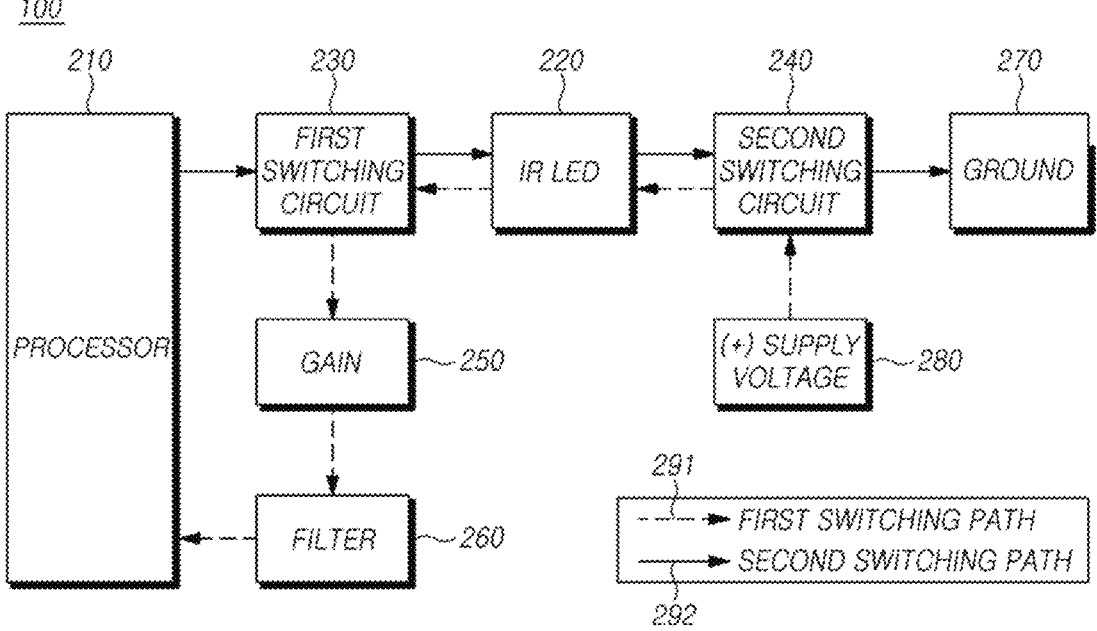
FIG. 2 illustrates a schematic circuit configuration and a switching path of a display device according to an embodiment of the disclosure.

FIG. 2 illustrates a schematic circuit configuration and a switching path of a display device according to an embodiment of the disclosure.

Referring to FIG. 2, the display device 100 may include a processor 210, an IR LED 220, a first switching circuit 230, a second switching circuit 240, a gain circuit 250, a filter circuit 260, and an IR receiver. The display device 100 may include additional components other than the illustrated components.

According to an embodiment, the IR receiver may receive a first IR signal in a predetermined frequency band from the remote control 120 of the display device 100. For example, the first IR signal may be preset to an IR carrier frequency of 38 kHz. The IR receiver may be implemented as a communication circuit including at least one electronic element that detects infrared light in the predetermined frequency band to generate an electrical signal. In an embodiment, the IR receiver may include an IR photodiode. As an example, the IR receiver may be installed in a partial area (e.g., a lower part) on a frontal edge (e.g., bezel) of the display device 100. The IR receiver may be installed adjacent to the IR LED 220.

According to an embodiment, the IR LED 220 may radiate an infrared signal under the control of the processor 210 to control the external device 110. For example, when the user of the display device 100 presses a button to control the external device 110 (e.g., a set-top box) using the remote control 120, the IR receiver may receive an infrared signal from the remote control 120. When the received infrared signal is identified as a signal for controlling the external device 110, the IR LED 220 may transmit an infrared signal for controlling the external device 110 to the external device 110 under the control of the processor 210. The IR LED 220 may be implemented as a communication circuit including at least one electronic element capable of outputting infrared rays. In an embodiment, the IR LED 220 may include at least one infrared light emitting diode and may have transmitting characteristics and receiving characteristics of IR LED in a predetermined band (e.g., 940 nm). The IR LED 220 may generate an IR signal modulated using a predetermined frequency band, for example, any one carrier frequency of 38 kHz, 40 kHz, and 56 kHz.

Further, according to an embodiment, the IR LED 220 may receive an infrared signal from the remote control 130 of the external device 110, using the receiving characteristics.

According to an embodiment, the processor 210 may execute operations or data processing related to the control and/or communication of one or more other components of the display device 100 by executing at least one instruction stored in a memory. The processor 210 may be implemented in the form of a system-on-chip (SoC), but it will be apparent to those skilled in the art that the processor 210 is not limited thereto. The processor 210 may include at least one of a central processing unit (CPU), a graphics processing unit (GPU), a micro controller unit (MCU), a sensor hub, a supplementary processor, a communication processor, an application processor, an application specific integrated circuit (ASIC), or a field programmable gate array (FPGA), and it may include one or more one cores.

According to an embodiment, the processor 210 may set a switching path such that, based on an infrared signal (hereinafter, a first IR signal) received by the IR receiver, the IR LED 220 transmits an infrared signal (hereinafter, a second IR signal) to the external device 110 or detects an infrared signal (hereinafter, a third IR signal) from the remote control 130 of the external device 110. The switching path may include a first switching path 291 and a second switching path 292 respectively corresponding to operations of an IR detecting mode capable of detecting the third IR signal and an IR blasting mode capable of transmitting the second IR signal. Accordingly, the processor 210 may set the first switching path 291 to operate in the IR detecting mode or may set the second switching path 292 to operate in the IR blasting mode. The third IR signal may be a preset IR signal at a predetermined IR carrier frequency or a frequency included in a predetermined IR carrier frequency band. For example, the third IR signal may be preset to an IR carrier frequency of 56 kHz.

According to an embodiment, the processor 210 may set the first switching path 291 as a default switching path. When the second IR signal is to be sent to the external device 110 via the IR LED 220, the processor 210 may switch the switching path to the second switching path. After controlling to transmit the second IR signal to the external device 110 via the IR LED 220, the processor 210 may control to return the switching path to the first switching path.

According to an embodiment, the first switching path 291 may include the processor 210, the first switching circuit 230, the IR LED 220, the second switching circuit 240, and a ground (power source connected to 0V) 270. The second switching path 292 may include a (+) supply voltage (or VDD) 280, the second switching circuit 240, the IR LED 220, the first switching circuit 230, the gain circuit 250, the filter circuit 260, and the processor 210. The first switching circuit 230 and the second switching circuit 240 may be electrically connected to both ends of the IR LED 220, respectively, and the gain circuit 250 and the filter circuit 260 may be sequentially connected to the first switching circuit 230 in the first switching path 291.

According to an embodiment, the gain circuit 250 may generate a fourth IR signal by amplifying the strength of the IR signal received by the IR LED 220 by a predetermined gain (or a signal amplification factor).

According to an embodiment, the filter circuit 260 may be configured to filter the third IR signal from the fourth IR signal. The processor 210 may detect the third IR signal by the filter circuit 260 filtering the third IR signal. The filter circuit 260 may be implemented as one of a band-pass filter that passes only a signal in between predetermined frequencies, a low-pass filter that passes only a signal of a predetermined frequency or less, and a high-pass filter that passes only a signal of a predetermined frequency more. For example, when the filter circuit 260 is implemented as a low-pass filter, a 56 kHz frequency band may be blocked, for example, by pre-setting its filtering threshold to a 50 kHz frequency, and when an IR signal in the 56 kHz frequency band is input, the filter circuit 260 may filter the 56 kHz IR signal by driving an input pin to the processor 210 low, thereby allowing the processor 210 to detect the 56 kHz IR signal. The processor 210 may identify a manufacturer and its product of the remote control 130 of the external device 110 based on the detected third IR signal. The third IR signal may include a signal section and a pause section. The signal section may refer to a section corresponding to ON state of the IR signal or a section corresponding to a signal encoded based on a user's button input, while the pause section may refer to a section corresponding to OFF state of the IR signal, other than the signal section. The processor 210 may identify a manufacturer and its product of the external device 110 or the remote control 130 of the external device 110, for example, by reading the length of the signal section of the third IR signal. Example operation of controlling the display device 100 based on the detected third IR signal will be described below with reference to FIGS. 3 to 4.

Figure 3:
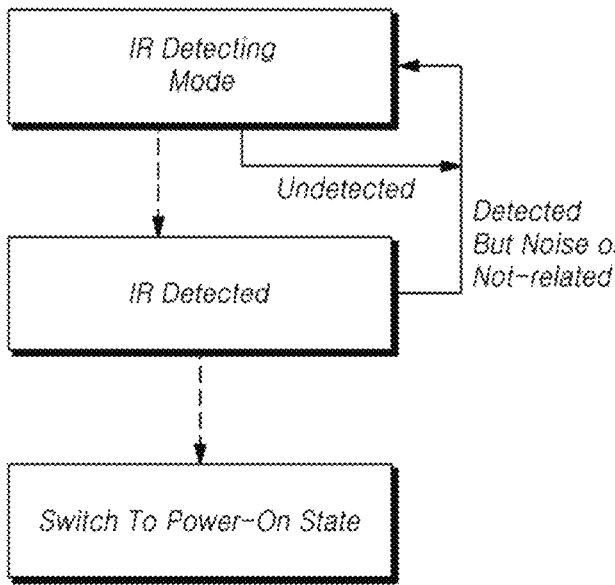
FIG. 3 is an example diagram of controlling a display device in a power-off state according to an embodiment of the disclosure.

FIG. 3 is an example diagram of controlling a display device in a power-off state according to an embodiment of the disclosure.

According to an embodiment, the power state of the display device 100 may include a power-on state and a power-off state. The power-on state may refer to a state in which the display device 100 displays an image. The power-off state may refer to a state in which the display device 100 is in either a standby mode or an art mode. The art mode may refer to a mode in which the display device 100 displays image contents such as e.g., a work of art or a photograph, like a picture frame, without displaying a video image thereon. The standby mode may refer to a state in which power consumption is reduced either automatically or manually based on a user input, under a certain condition, such as when no external input signal is detected.

According to an embodiment, with the circuit configuration described above with reference to FIG. 2, the processor 210 may control to operate in the IR detecting mode capable of detecting an infrared signal (or the third IR signal) from the remote control 130 of the external device 110, or to operate in the IR blasting mode capable of transmitting, by the IR LED 220, an infrared signal (or the second IR signal) to the external device 110 based on an infrared signal (or the first IR signal) received by the IR receiver. The processor 210 may set the first switching path 291 to operate in the IR detecting mode or may set the second switching path 292 to operate in the IR blasting mode. The processor 210 may set the first switching path 291 as a default switching path, and when the processor 210 intends to transmit the second IR signal to the external device 110 via the IR LED 220, the processor 210 may switch the switching path to the second switching path 292. The processor 210 may control to return the switching path to the first switching path, after transmitting the second IR signal to the external device 110 via the IR LED 220.

Referring to FIG. 3, when the power state of the display device 100 is the power-off state and an infrared signal (or the third IR signal) is detected from the remote control 130 of the external device 110 through the first switching path 291 in the IR detecting mode, the processor 210 may control to switch the power state to the power-on state. When the display device 100 fails to detect the third IR signal, or the display device 100 determines that the third IR signal is noise or an unrelated signal even if it is detected, the processor 210 may control to maintain the operation of the IR detecting mode.

Figure 4:
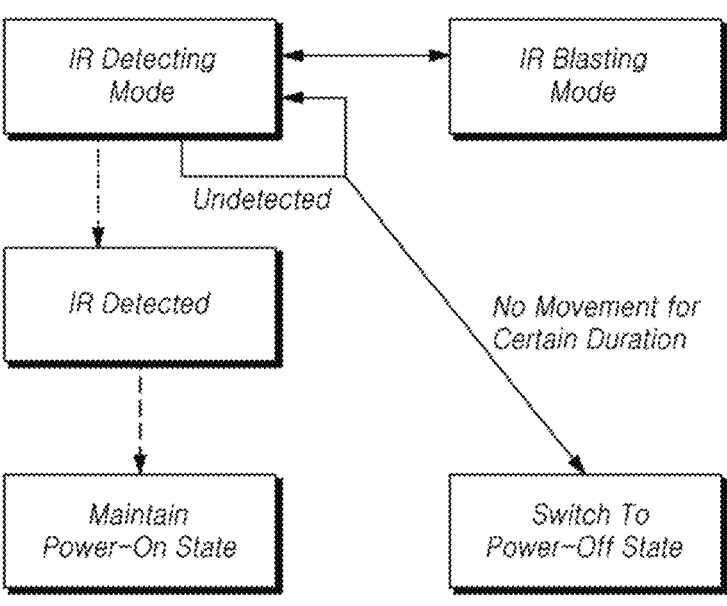
FIG. 4 is an example diagram of controlling a display device in a power-on state according to an embodiment of the disclosure.

FIG. 4 is an example diagram of controlling a display device in a power-on state according to an embodiment of the disclosure.

Referring to FIG. 4, when the power state of the display device 100 is the power-on state and an infrared signal (or the third IR signal) is detected from the remote control 130 of the external device 110 through the first switching path 291 in the IR detecting mode, the processor 210 may control to maintain the power-on state. When the display device 100 does not detect the third IR signal, the processor 210 may control to maintain the operation of the IR detecting mode.

Referring to FIG. 4, when the display device 100 is in the power-on state and the IR LED 220 intends to transmit the infrared signal (or the second IR signal) to the external device 110 based on an infrared signal (or the first IR signal) received by the IR receiver in the IR detecting mode, the processor 210 may control to switch the switching path to the second switching path 292 and operate in the IR blasting mode. After transmitting the second IR signal to the external device 110 via the IR LED 220, the processor 210 may control the device to return the switching path to the first switching path and operate in the IR detecting mode.

Referring to FIG. 4, when the display device 100 does neither transmit the second IR signal nor detect the third IR signal for a predetermined time in the power-on state, the display device 100 may control to switch the power-on state to the power-off state. The predetermined time may be preset to, for example, 2 hours or 4 hours, but it will be apparent to those skilled in the art that the predetermined time may be set to various values.

Figure 5:
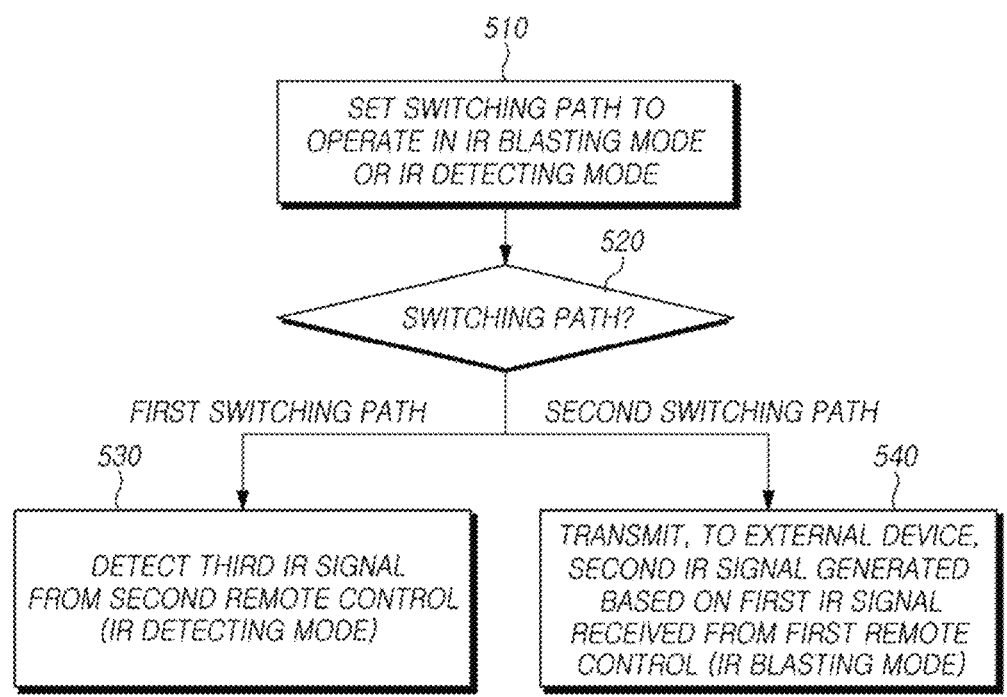
FIG. 5 illustrates a control flow of operations in which a display device operates in an IR blasting mode or an IR detecting mode based on a switching path set according to an embodiment of the disclosure.

FIG. 5 illustrates an operation control flow in which a display device operates in an IR blasting mode or an IR detecting mode based on a switching path set according to an embodiment of the disclosure.

The display device 100 may receive a first IR signal from a first remote control (or a remote control of the display device 100) and generate a second IR signal based on the first IR signal.

Referring to FIG. 5, according to an embodiment, in operation 510, the display device 100 may set a switching path to operate in either an IR blasting mode or an IR detecting mode. The switching path may include a first switching path 291 and a second switching path 292 corresponding to operations of each of the IR detecting mode capable of detecting a third IR signal from a second remote control (or a remote control of the external device 110) and the IR blasting mode capable of transmitting the second IR signal. The display device 100 may set the first switching path 291 to operate in the IR detecting mode, or set the second switching path 292 to operate in the IR blasting mode. The display device 100 may set the first switching path 291 as the default switching path, and may switch the switching path to the second switching path 292 when it intends to transmit the second IR signal to the external device 110. Further, after transmitting the second IR signal to the external device 110, the display device 100 may control to return the switching path to the first switching path 291. The third IR signal may be a preset IR signal at a predetermined IR carrier frequency or a frequency included in a predetermined IR carrier frequency band. For example, the third IR signal may be preset to an IR carrier frequency of 56 kHz.

When the set switching path is the first switching path 291, in operation 530, the display device 100 may operate in the IR detecting mode capable of detecting the third IR signal from the second remote control (or the remote control of the external device 110).

When the set switching path is the second switching path 292, in operation 540, the display device 100 may operate in the IR blasting mode capable of transmitting, to the external device 110, the second IR signal generated based on the first IR signal received from the first remote control (or the remote control of the display device 100).

The electronic device according to various embodiments may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. For example, a component expressed in the singular is to be understood as including a plurality of components unless the context clearly indicates only a singular meaning. As used in the present document, the term "or" is to be understood to encompass all possible combinations of one or more of the enumerated items. As used in the disclosure, the terms "comprise(s)", "have/has", "include(s)", "consist(s)

of", and the like are intended only to designate the presence of features, components, parts, or combinations thereof described in the disclosure, and the use of such terms is not intended to exclude the possibility of presence or addition of one or more other features, components, parts, or combinations thereof. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st", "2nd", or "first" or "second" may be used to simply distinguish a corresponding component from another, and does not limit the components in other aspect (e.g., importance or order).

As used in connection with various embodiments of the disclosure, the term "~ portion" or "~ module" may include a unit implemented in hardware, software, or firmware, and may interchangeably be used with other terms, for example, "logic", "logic block", "part", or "circuit". Such a "~ portion" or "~ module" may be a single integral component, or a minimum unit or a part of the component, adapted to perform one or more functions. For example, according to an embodiment, the "~ portion" or "~ module" may be implemented in the form of an application-specific integrated circuit (ASIC).

As used in connection with various embodiments of the disclosure, the term "in case that ~" may be interpreted to mean "when ~", "if ~", "in response to determining ~", or "in response to detecting ~", depending on the context. Similarly, the phrases "when it is determined that ~" or "when it is detected to be ~" may be interpreted to mean "when determining ~", "in response to determining ~", "when detecting ~" or "in response to detecting ~", depending on the context.

The program executed by the display device 100 as described in the disclosure may be implemented as a hardware component, a software component, and/or a combination of the hardware component and the software component. The program may be performed by any system capable of executing computer-readable instructions.

Software may include a computer program, a code, an instruction, or a combination of one or more of them, and may configure a processing unit to operate as desired or instruct the processing unit independently or collectively. The software may be implemented as a computer program including instructions stored in a computer-readable storage medium. The computer-readable storage media may include, for example, magnetic storage media (e.g., read-only memory (ROM), random-access memory (RAM), a floppy disk, hard disk, etc.), optical readable media (e.g., compact disc read only memory (CD-ROM), digital versatile disc (DVD)) and the like. The computer-readable storage media may be distributed over networked computer systems, so that computer-readable codes may be stored and executed in a distributed manner. The computer program product may be distributed (e.g., downloaded or uploaded) directly or online through an application store (e.g., PlayStore™) or between two user devices (e.g., smartphones). If distributed online, at least part of the computer program product may be at least temporarily stored or generated in a machine-readable storage medium, such as memories of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more components or operations of the above-described components may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A display device, comprising:
an IR receiver configured to receive a first IR signal from a first remote control;
an IR LED configured to transmit a second IR signal based on the first IR signal to an external device and receive a third IR signal from a second remote control;
a first switching circuit and a second switching circuit connected to respective ends of the IR LED;
a gain circuit and a filter circuit connected in sequence to the first switching circuit; and
at least one processor configured to set a switching path as one among a second switching path to transmit the second IR signal and a first switching path to detect the third IR signal.

2. The display device of claim 1,
wherein the first switching path and the second switching path respectively correspond to operations of an IR detecting mode configured to detect the third IR signal and an IR blasting mode configured to transmit the second IR signal, and
wherein the at least one processor is further configured to set the switching path as one among the first switching path to operate in the IR detecting mode and the second switching path to operate in the IR blasting mode.

3. The display device of claim 2, wherein the at least one processor is further configured to:
set the switching path as the first switching path,
in case that the second IR signal is to be transmitted to the external device through the IR LED, switch the switching path to the second switching path, and
after transmitting the second IR signal to the external device through the IR LED, return the switching path to the first switching path.

4. The display device of claim 1, wherein the third IR signal is a preset IR signal at a predetermined IR carrier frequency or a frequency included in a predetermined IR carrier frequency band.

5. The display device of claim 4,
wherein the gain circuit is configured to generate a fourth IR signal by amplifying a strength of an IR signal received by the IR LED by a predetermined gain, and
wherein the filter circuit is configured to filter the third IR signal from the fourth IR signal.

6. The display device of claim 1,
wherein a power state of the display device comprises a power-on state and a power-off state, and
wherein the at least one processor is further configured to:
in case that the third IR signal is detected in the power-off state, control to switch the power state to the power-on state, and
in case that the third IR signal is detected in the power-on state, control to maintain the power state in the power-on state.

7. The display device of claim 6, wherein, in case that the second IR signal is not transmitted or the third IR signal is not detected for a predetermined time in the power-on state, the at least one processor is further configured to control to switch the power state to the power-off state.

8. The display device of claim 1,
wherein the first IR signal is an IR carrier frequency in a 38 kHz frequency band, and
wherein the third IR signal is an IR carrier frequency in a 56 kHz frequency band.

9. A method for controlling a display device, comprising:
receiving a first IR signal from a first remote control;
generating a second IR signal based on the first IR signal;
setting a switching path as one among a second switching path to transmit the second IR signal to an external device and a first switching path to detect a third IR signal from a second remote control;
transmitting the second IR signal to the external device based on the switching path; and
detecting the third IR signal from the second remote control based on the switching path.

10. The method of claim 9,
wherein the first switching path and the second switching path respectively correspond to operations of an IR detecting mode configured to detect the third IR signal and an IR blasting mode configured to transmit the second IR signal, and
wherein the setting the switching path comprises setting the switching path as one among the first switching path to operate in the IR detecting mode and the second switching path to operate in the IR blasting mode.

11. The method of claim 10,
wherein the setting the switching path further comprises,
setting the switching path as the first switching path,
in case that the second IR signal is to be transmitted to the external device, switching the switching path to the second switching path, and
after transmitting the second IR signal to the external device, returning the switching path to the first switching path.

12. The method of claim 9,
wherein the third IR signal is a preset IR signal at a predetermined IR carrier frequency or a frequency included in a predetermined IR carrier frequency band.

13. The method of claim 12, wherein the detecting the third IR signal from the second remote control comprises:
generating a fourth IR signal by amplifying a strength of an IR signal received by an IR LED by a predetermined gain; and
filtering the third IR signal from the fourth IR signal.

14. The method of claim 9, wherein a power state of the display device comprises a power-on state and a power-off state, and wherein the method further comprises:

in case that the third IR signal is detected in the power-off state, controlling to switch the power state to the power-on state, and in case that the third IR signal is detected in the power-on state, controlling to maintain the power state in the power-on state.

15. The method of claim 14, further comprising controlling to switch the power state to the power-off state, in case that the second IR signal is not transmitted or the third IR signal is not detected for a predetermined time when the power state is in the power-on state.

* * * * *